(12) United States Patent
Pafchek et al.

(10) Patent No.: US 6,643,441 B1
(45) Date of Patent: Nov. 4, 2003

(54) OPTOELECTRONIC DEVICE HAVING A DIRECT PATCH MASK FORMED THEREON AND A METHOD OF MANUFACTURE THEREFOR

(75) Inventors: Robert M. Pafchek, Blandon, PA (US); John Salama, Lawrenceville, GA (US)

(73) Assignee: Agere Sytems Inc., Allentown, PA (US)

( * ) Notice: Subject to any disclaimer, the term of this patent is extended or adjusted under 35 U.S.C. 154(b) by 0 days.

(21) Appl. No.: 09/651,543

(22) Filed: Aug. 29, 2000

(51) Int. Cl.$^7$ .................................................. G02B 6/10
(52) U.S. Cl. ........................ 385/129; 385/130; 385/141
(58) Field of Search .................... 385/129–132, 385/141–145

(56) References Cited

U.S. PATENT DOCUMENTS

| | | | | |
|---|---|---|---|---|
| 4,900,112 A | * | 2/1990 | Kawachi et al. | 385/130 |
| 5,506,925 A | * | 4/1996 | Greene et al. | 385/129 |
| 5,559,907 A | * | 9/1996 | Inniss et al. | 385/11 |
| 5,625,723 A | * | 4/1997 | Dragone et al. | 385/11 |
| 5,881,187 A | * | 3/1999 | Modavis | 385/37 |
| 6,331,382 B1 | * | 12/2001 | Robertsson | 385/48 |

FOREIGN PATENT DOCUMENTS

JP   11-109156   * 4/1999

OTHER PUBLICATIONS

Hibino et al, Increase in Photosensitivity in Silica–Based Optical Waveguides on Silicon, Apr. 1993, Electronics Letters, vol. 29 No. 7 pp. 621–623.*

Y.P. Li and C.H. Henry; Silica–Based Optical Integrated Circuits; IEE Proceedings Optoelectronics, vol. 143, No. 5; Oct. 1996; pp. 263–280.

* cited by examiner

*Primary Examiner*—Rodney Bovernick
*Assistant Examiner*—Juliana K. Kang (57) ABSTRACT

The present invention provides an optoelectronic device with superior qualities. The optoelectronic device includes an optical core feature located over a substrate, an outer cladding layer located over the optical core feature and a direct patch mask formed on an outer cladding layer. In an exemplary embodiment of the invention, the direct patch mask has a light source passed therethrough that corrects birefringence in the optical core feature and the outer cladding layer.

23 Claims, 8 Drawing Sheets

OPTOELECTRONIC DEVICE HAVING A DIRECT PATCH MASK FORMED THEREON AND A METHOD OF MANUFACTURE THEREFOR

TECHNICAL FIELD OF THE INVENTION

The present invention is directed, in general, to an optical device and, more specifically, to an optoelectronic device having a direct patch mask formed thereon, and a method of manufacture therefor.

BACKGROUND OF THE INVENTION

As optical communications advance, more and more passive optical components are needed, e.g., broadband multiplexors are needed for delivering voice and video to the home, for combining pump and signals in an optical amplifier and for adding a monitoring signal to the traffic on optical fibers. Dense wavelength division multiplexing (WDM) systems need multiplexers to combine and separate channels of different wavelengths and also need add-drop filters to partially alter the traffic. Splitters and star couplers are used in broadcast applications. Low speed optical switches are needed for sparing applications and network reconfiguration.

Currently, silica-based integrated optical waveguide technology is well known and used in the industry for the above mentioned devices. A typical silica-based integrated optical waveguide may comprise a silicon substrate having an undoped silica base layer located thereon. Also, a phosphorous doped and/or germanium core layer is typically located over the base layer. The core layer is patterned and etched to form individual cores. A boron/phosphorous doped silica glass cladding layer may also be blanket deposited over the individual cores.

One problem associated with current optical waveguide technology is birefringence. Since core layers and cladding layers are typically made of different materials, they often have different refractive indices. For example, the core material may comprise a phosphorous doped silica layer and the cladding may comprise a borosilicate glass. The two layers have different thermal expansion coefficients, such that when the molten fiber solidifies after deposition and. annealing, stresses are introduced and frozen into the materials. These stresses tend to cause birefringence of the transverse electric mode (TE) and the transverse magnetic mode (TM). Birefringence often results in polarization dependent wavelength (PDW). PDW is a shift in the center wavelength between the TE and TM modes. For most applications, and especially system applications, this polarization. is undesirable because it generally requires that the two modes be matched.

Currently, one technique used by optoelectronics suppliers uses ultraviolet light and an independent patch mask to correct birefringence. The patch mask commonly comprises a glass substrate having a patterned metal layer formed thereon. The pattern in the metal layer typically mirrors the location of the previously discussed cores, i.e., the metal layer has been patterned and etched to leave unprotected areas over where the cores are located. After the patch mask has been manufactured, the patch mask is visually placed over the device. Ultra violet (UV) light is then projected through the mask, which alters the properties of the film.

Using the patch mask to correct birefringence, as previously described, currently encounters certain problems. One problem results from manual placement of the patch mask over the device. Currently, a window in the patch mask is used to manually align a cross hair in the window with an alignment mark previously manufactured in the device. This manual aspect tends to cause distortion, and furthermore, requires additional unwanted wafer real estate to form such alignment marks.

Another problem is UV intensity variations across the waveguide. This is assumed to be a result of inconsistencies in the glass substrate as the UV light passes through the glass. Another problem is dispersion of the UV light. As with any process requiring passing particles through a pattern to affect a separate surface, the further the pattern is away from the separate surface, the more the dispersion of the particles that results. Inherent in the conventional patch mask process is the glass substrate, on which the patterned metal layer is formed. The glass substrate, located between the patterned metal layer and the separate surface, typically causes such dispersion.

Accordingly, what is needed in the art is a passive optical component that does not experience the prior art's problems associated with correcting birefringence, and a method of manufacture thereof.

SUMMARY OF THE INVENTION

To address the above-discussed deficiencies of the prior art, the present invention provides an optoelectronic device with superior qualities. The optoelectronic device includes an optical core feature located over a substrate, an outer cladding layer located over the optical core feature and a direct patch mask located and formed on an outer cladding layer. In an exemplary embodiment of the invention, the direct patch mask has a light source passed therethrough that corrects birefringence in the optical core feature and the outer cladding layer.

BRIEF DESCRIPTION OF THE DRAWINGS

The invention is best understood from the following detailed description when read with the accompanying FIGUREs. It is emphasized that in accordance with the standard practice in the optoelectronic industry, various features are not drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Figure 1:
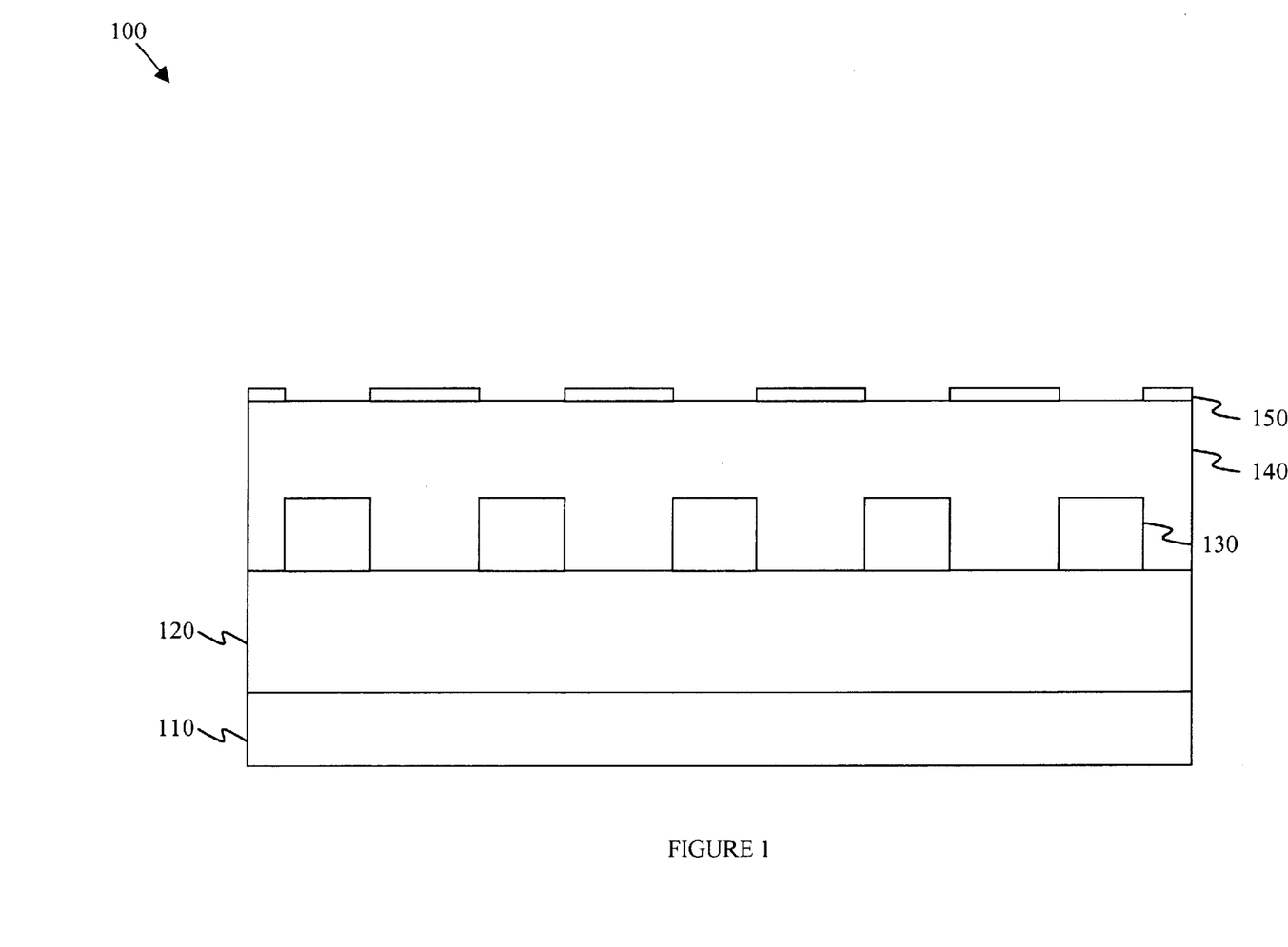
FIG. 1 illustrates one embodiment of a completed optoelectronic device, taught herein.

Referring initially to FIG. 1, illustrated is a cross-sectional view of an exemplary embodiment of a completed optoelectronic device 100. In the illustrative embodiment shown in FIG. 1, the completed optoelectronic device 100 includes an inner cladding layer 120 formed over a substrate 110, optical core features 130 formed over the inner cladding layer 120 and an outer cladding layer 140 formed over the optical core features 130. Likewise, in contrast to the prior art optical waveguide technologies, the completed optoelectronic device 100 includes a direct patch mask 150 formed on the outer cladding layer 140.

The direct patch mask 150 substantially corrects many of the problems associated with using the prior art independent patch masks. Since the direct patch mask 150 is directly formed on the outer cladding layer 140, rather than being formed on a glass substrate which then is manually laid upon the outer cladding layer, the direct patch mask 150 can be used more accurately and in a much less labor intensive manner. Also, since the direct patch mask 150 is formed on the layer, rather than being formed on the glass substrate, substantially no dispersion of light occurs during UV illumination. Additional benefits are that substantially no distortion occurs due to improper alignment of the direct patch mask 150, and substantially no UV intensity variations occur across the optical core features 130 and outer cladding layer 140.

Thus, one aspect of the invention provides an optoelectronic device that does not experience the disadvantages experienced by the prior art optoelectronic devices during correction of the birefringence. Moreover, since the direct patch mask is formed on the outer cladding layer and has no glass substrate located there between, the optoelectronic device does not experience UV intensity variations caused by the glass substrate, distortion and dispersion of the light source. Since the direct patch mask is formed on the outer cladding, it may be accurately aligned using conventional photolithographic processes, which can save wafer real estate by substituting the large visual alignment features with small photolithography alignment marks and thus, save both time and money.

Figure 2:
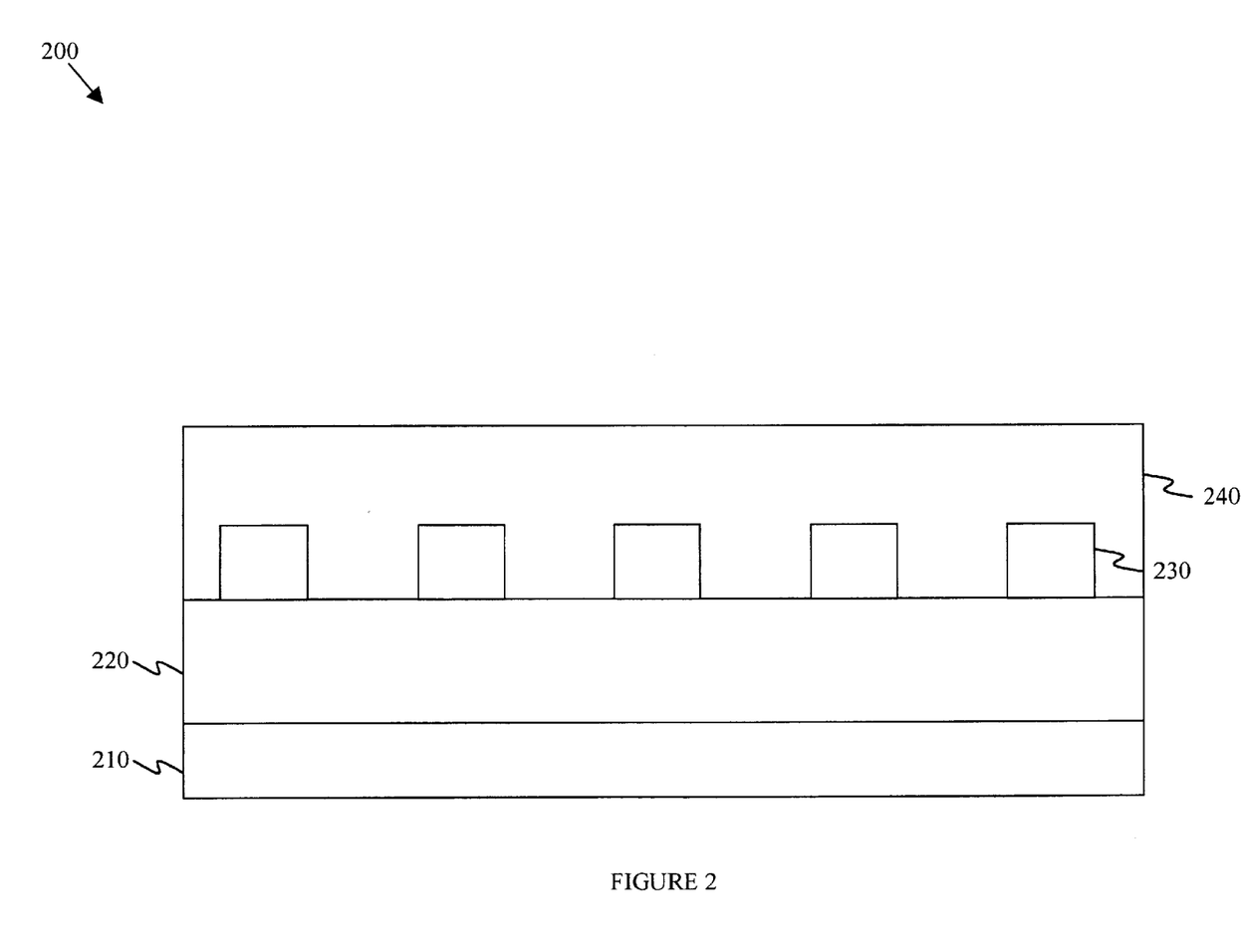
FIG. 2 illustrates a partially completed optoelectronic device, including a substrate, an inner cladding layer, optical core features and an outer cladding layer.

Turning to FIGS. 2–6, with continued reference to FIG. 1, illustrated are detailed manufacturing steps instructing how one might, in a preferred embodiment, manufacture the completed optoelectronic device 100 depicted in FIG. 1. FIG. 2 illustrates a cross-sectional view of a partially completed optoelectronic device 200. The partially completed optoelectronic device illustrated in FIG. 2, includes an inner cladding layer 220, which in a previous step, was formed over a substrate 210. The inner cladding layer 220, in an exemplary embodiment, forms a lower cladding layer. The substrate 210 may be any layer located in an optoelectronic device, including a layer located at the wafer level or a layer located above or below wafer level. The substrate 210, in an exemplary embodiment, is a silicon substrate. However, it should be understood that other materials, doped or undoped, may also be used.

In an exemplary embodiment, the inner cladding layer 220, which is commonly referred to as a base layer, is an undoped silica inner cladding layer having an index of refraction of about 1.4575. Typically, the inner cladding layer 220 is the most rigid layer and keeps the optical core features from moving after it is formed and patterned. Likewise, a common thickness for the inner cladding layer 220 is about 35000 nm. The inner cladding layer 220 tends to isolate the fundamental mode from the silicon substrate and thereby attempts to reduce leakage through the inner cladding layer 220 to substrate 210 interface, which may not be completely reflective. Even though specifics have been given for the material used, thicknesses, and index of refraction of the inner cladding layer 220, they have only been given as examples, and it should be understood that other materials, thicknesses, and indices are within the scope of the present invention.

Formed over the inner cladding layer 220 are one or more optical core features 230. The formation of the optical core features 230 are conventional. In the illustrative embodiment, the optical core features 230 comprise a phosphorous doped silica material; however, one skilled in the art understands that the optical core features 230 could comprise any material consistent with optoelectronic devices. The optical core features 230 may have a thickness ranging from about 1000 nm to about 10000 and a width ranging from about 1000 nm to about 15000 nm. However, the thickness of the optical core features 230 depends on the delta of the optoelectronic device it is included within, and in an exemplary embodiment is about 6800 nm. To achieve optical confinement, the optical core feature's 230 refractive index is typically increased by a small amount over the refractive index of the inner cladding layer 220. For example, where the refractive index of the inner cladding layer 220 is about 1.4575, as discussed above, the refractive index of the optical core features may be about 1.4664.

Formed over the optical core features 230 is an outer cladding layer 240. In an exemplary embodiment, the thickness of the outer cladding layer 240 may range from about 5000 nm to about 25000 nm. To promote filling in between the closely spaced optical core features 230, the outer cladding should flow readily, while the optical core features 230 and inner cladding layer 220 remain rigid. Likewise, the outer cladding layer's 240 refractive index should match the inner cladding layer's 220 refractive index. These demanding requirements may be met by using an outer cladding layer 240 comprising a boron phosphorous doped tetraethylorthosilicate glass. In such an exemplary embodiment, the addition of boron to the outer cladding layer 240 lowers both the flow temperature and the refractive index, which may compensate for the increase in refractive index caused by the addition of phosphorous.

The completed structure shown in FIG. 2 illustrates a conventional waveguide after fabrication but prior to UV illumination to correct birefringence. Thus, the structure shown in FIG. 2 might have polarization dependent wavelength (PDW), which is a shift in the center wavelength between the transverse electric mode (TE) and the transverse magnetic mode (TM).

Figure 3:
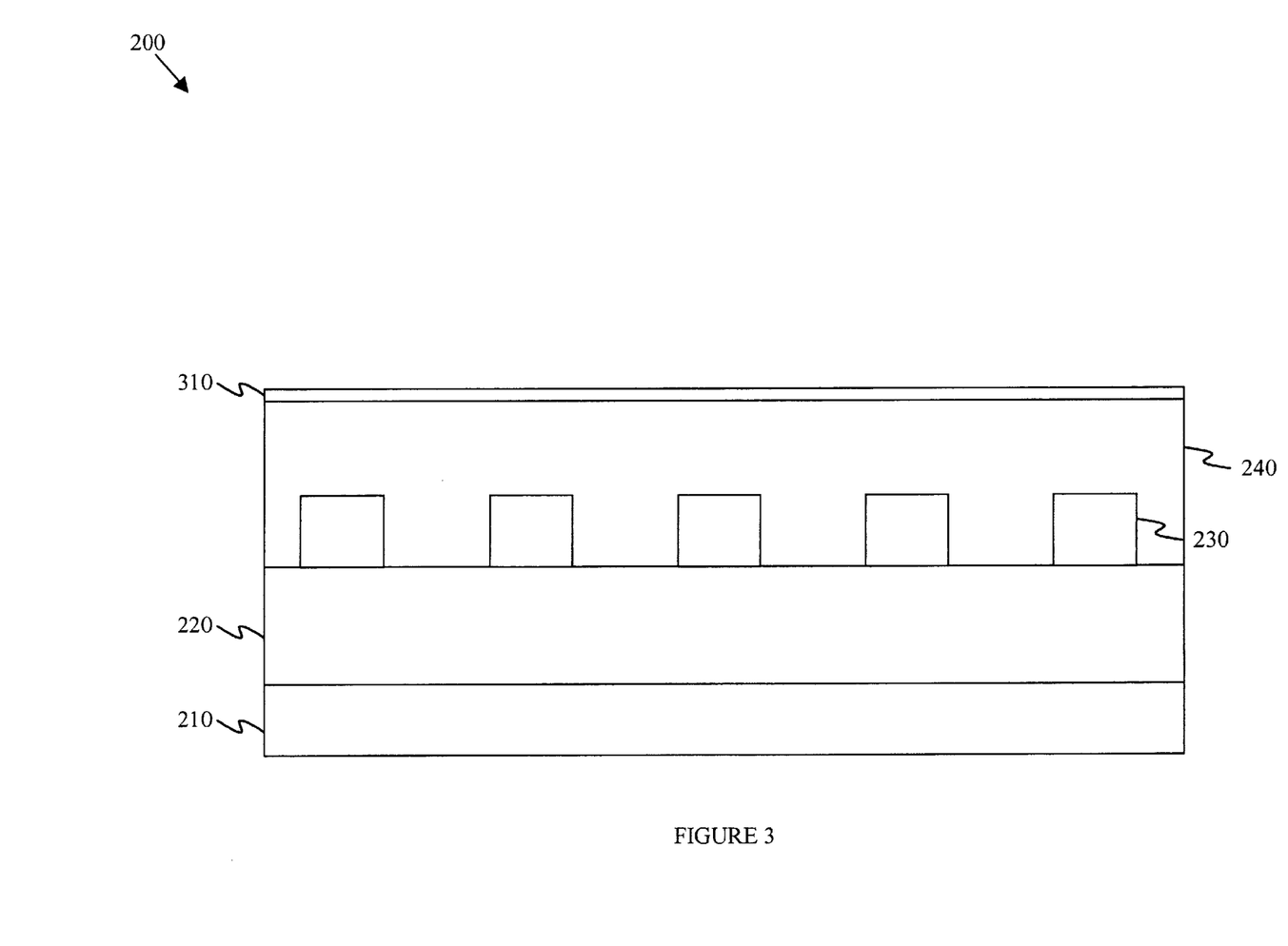
FIG. 3 illustrates the device illustrated in FIG. 2 after formation of a direct patch mask layer.

Turning to FIG. 3, illustrated is the formation of a structure to correct this PDW. FIG. 3 illustrates the formation of a patch mask layer 310, located and formed on the optical core feature 230. The patch mask layer 310, in the illustrative embodiment, comprises an essentially opaque material. For example, in an exemplary embodiment, the opaque material is a metal, which may in a more exemplary embodiment, be selected from the group consisting of molybdenum, tantalum, tungsten, chrome, gold, titanium, or another similar material. It should be understood that the thickness of the patch mask layer 310 may vary, but should be thick enough to be sufficiently opaque. In one advantageous embodiment, the thickness of the patch mask layer 310 ranges from about 10 nm to about 500 nm, and in another exemplary embodiment the thickness of the patch mask layer 310 ranges from about 50 nm to about 200 nm. However, one having skill in the art understands that the effectiveness of the direct patch mask 510 (FIG. 5) is partially dependent on the thickness thereof and the material composition therefor. The patch mask layer 310 may be formed using many manufacturing processes. For example, it is common to form such layers using a physical vapor deposition (PVD) process, an evaporation process, or another similar process. It should also be noted that an adhesion layer, depending on the design or type of metal used, might be present between the patch mask layer 310 and the optical core feature 240.

Figure 4:
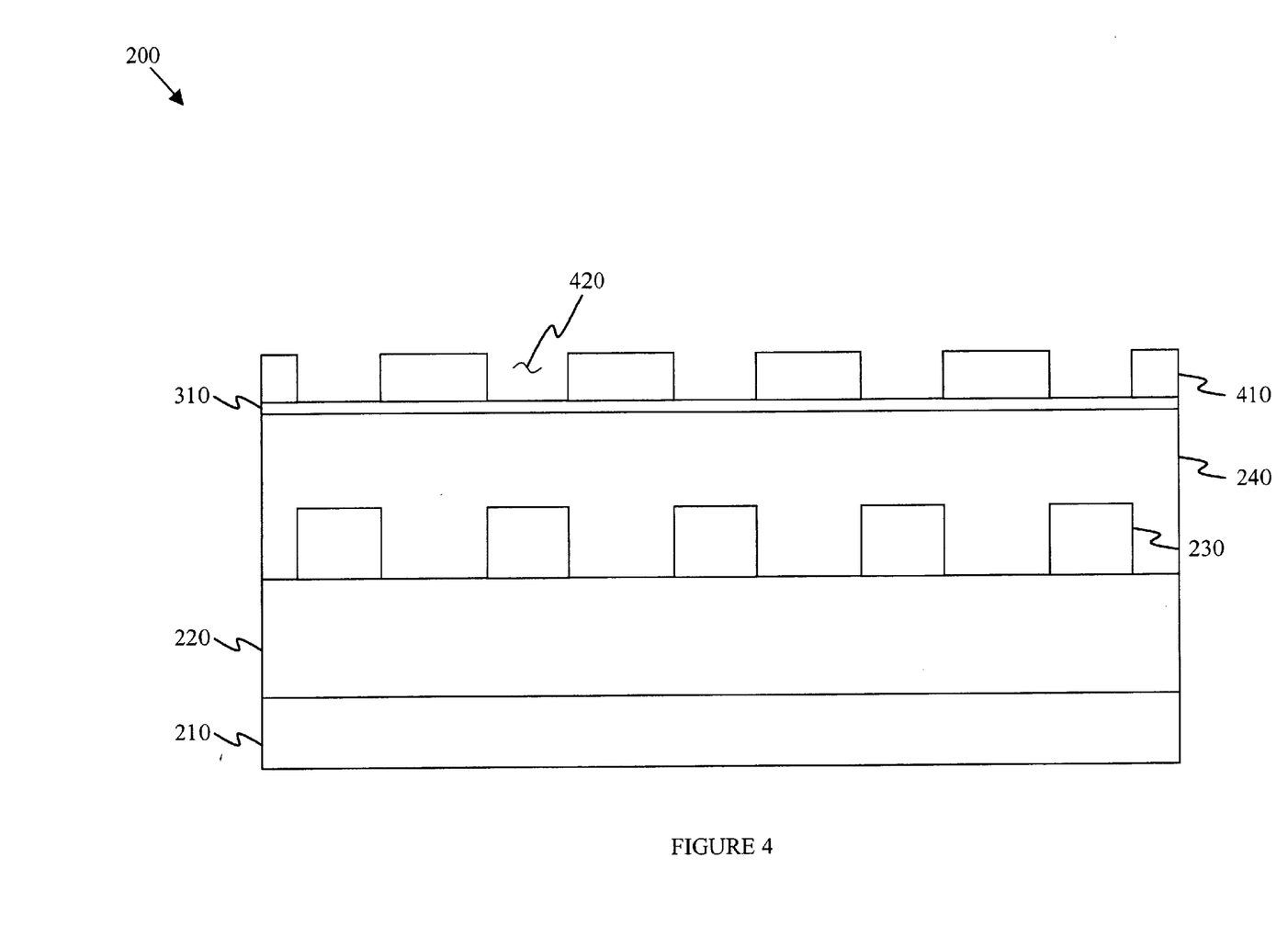
FIG. 4 illustrates the device illustrated in FIG. 3 after formation and patterning of a photoresist layer.

Turning to FIG. 4, illustrated is the partially completed optoelectronic device 200 illustrated in FIG. 3, after conventional formation of photoresist portions 410. As illustrated, the photoresist layer is patterned and developed to leave unprotected portions 420 over the optical core features 230.

Figure 5:
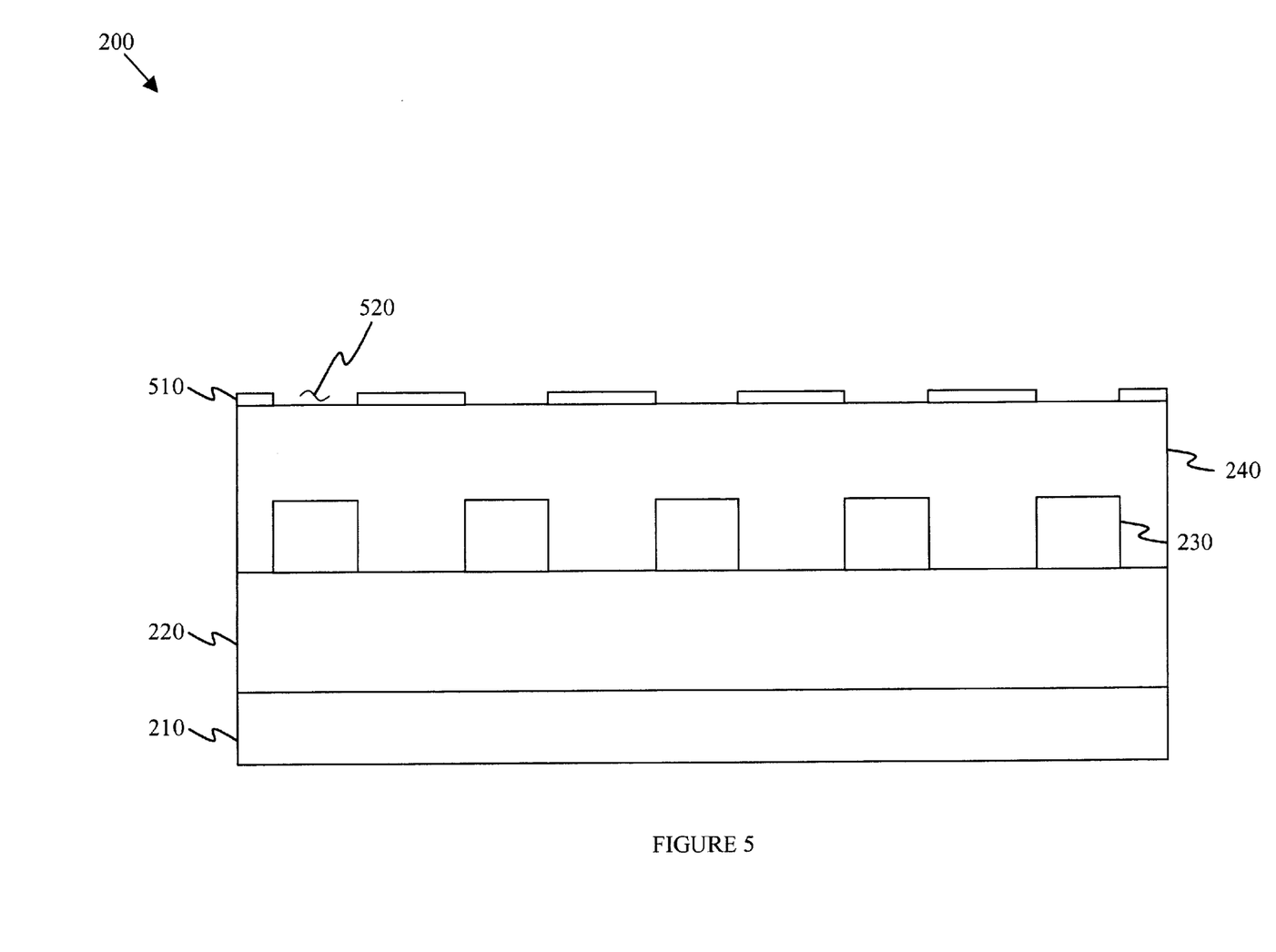
FIG. 5 illustrates the device illustrated in FIG. 4 after etching the direct patch mask layer and removal of photoresist portions.

Turning to FIG. 5, illustrated is the partially completed optoelectronic device 200 illustrated in FIG. 4, after etching the unprotected portions 420 of the patch mask layer 310, and removal of the photoresist portions 410. In an exemplary embodiment, a conventional wet etch is used to remove the unprotected portions; however, one skilled in the art understands that other removal processes may be used. What results, is a direct patch mask 510, having openings 520 formed therein directly over the optical core features 230 through which light may pass to change the refractive index of the underlying layers. Since the direct patch mask 510 is formed using conventional techniques, the mask can be very accurately formed having the openings 520 directly over the optical core features 230, as opposed to prior art processes.

Figure 6:
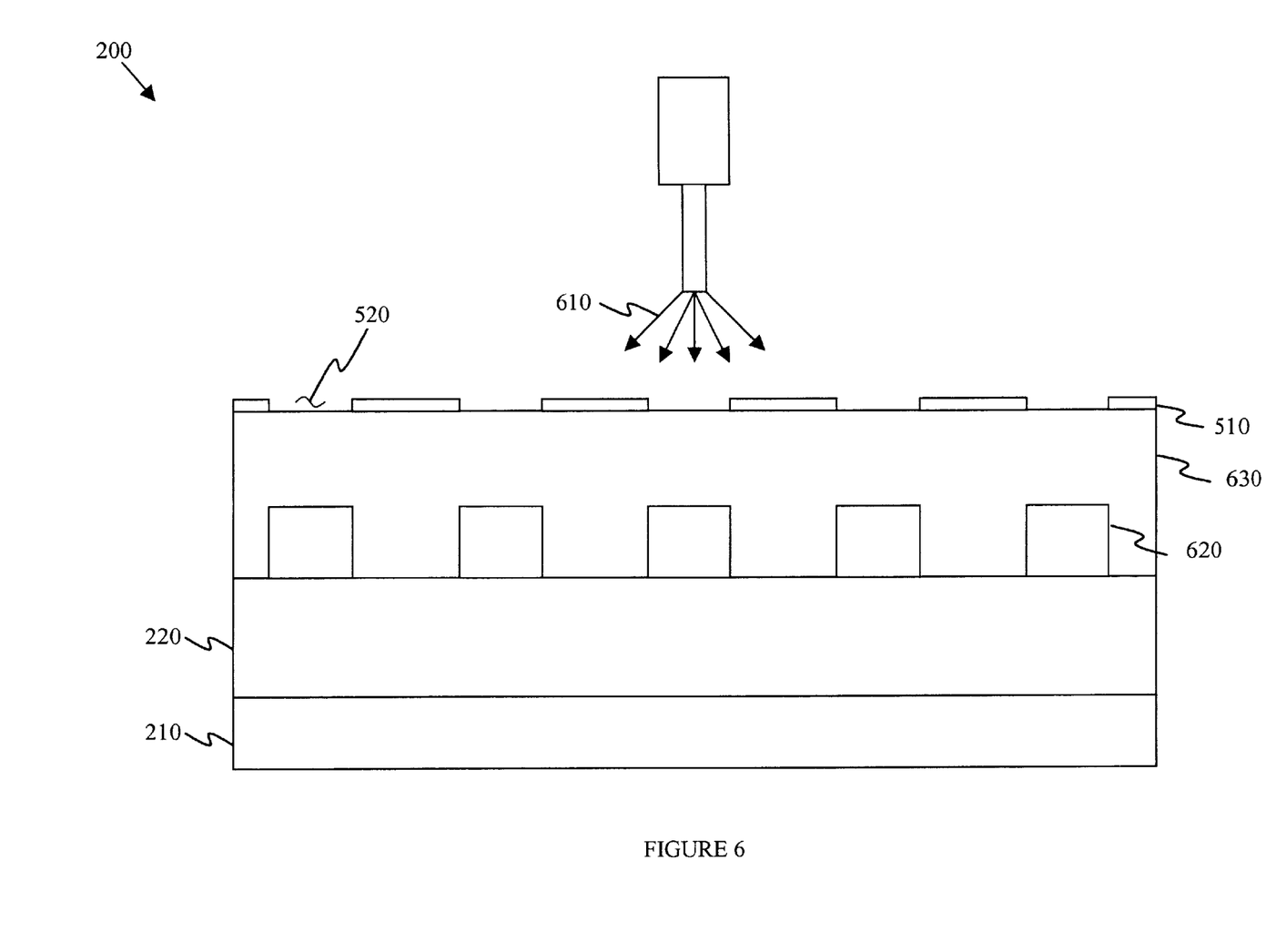
FIG. 6 illustrates the device shown in FIG. 5 being subjected to a light source, wherein the light source is attempting to correct birefringence.

Turning to FIG. 6, illustrated is the partially completed optoelectronic device 200 illustrated in FIG. 5, while being exposed to a light source 610. The light source 610, which typically is an ultraviolet light source, attempts to bring the center wavelength for the TE mode in line with the center wavelength for the TM mode. What results, are optical devices wherein birefringence is substantially eliminated. The specifics of using a light source to correct birefringence, and thus correct polarization dependent wavelength (PDW), is well known in the art. After completely subjecting the partially completed optoelectronic device 200 to the light source 610, the light source 610 may be removed resulting in the completed optoelectronic device 100 illustrated in FIG. 1.

Figure 7:
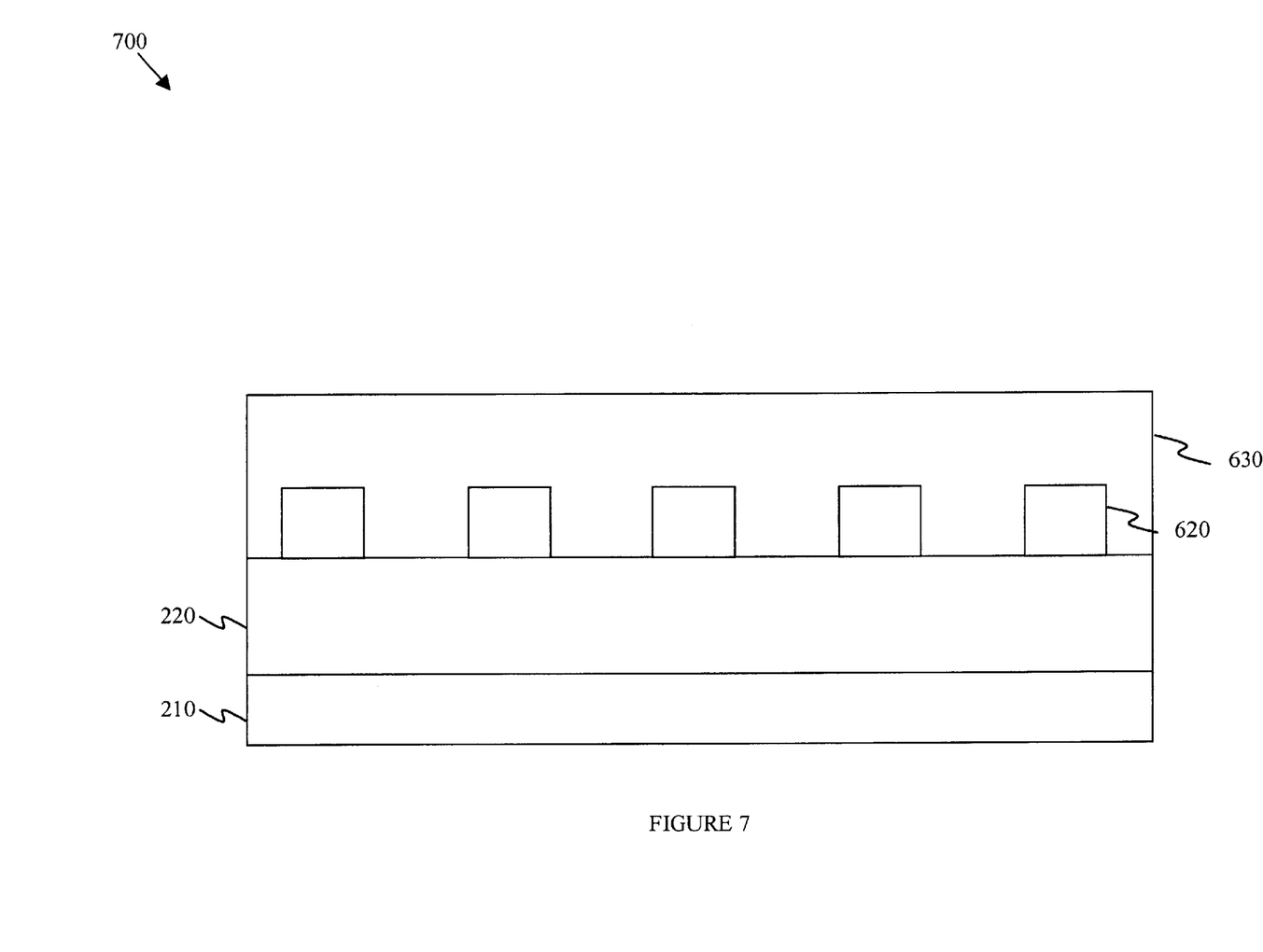
FIG. 7 illustrates an alternative embodiment of the completed optoelectronic device illustrated in FIG. 1, wherein the direct patch mask is removed subsequent to exposure to the light source.

Turning to FIG. 7, illustrated is an optional exemplary embodiment of the completed optoelectronic device 700, where the direct patch mask 510 illustrated in FIG. 6, is removed subsequent to exposure to the light source 610. In such an exemplary embodiment, the direct patch mask 510 may be removed using any removal technique, such as a reactive ion etch or wet etch, that is consistent with the present invention. It should be noted that removal of the direct patch mask 510 subsequent to exposure to the light source 610 is an optional step, and should not be construed to limit the scope of the present invention. Thus, if so desired, the direct patch mask 510 may be left on the device.

Figure 8:
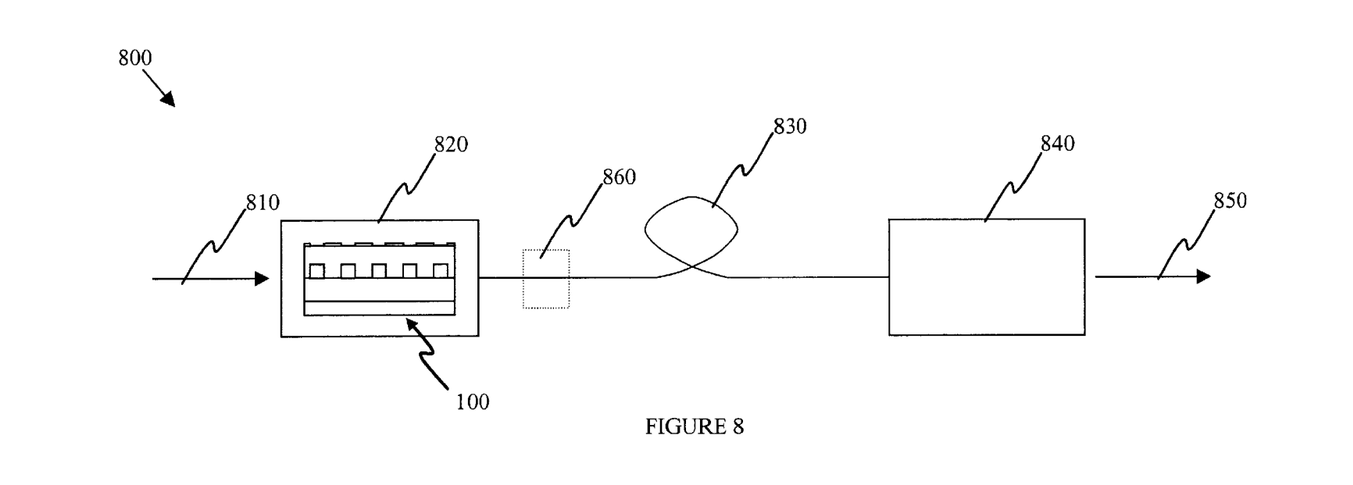
FIG. 8 illustrates an optical fiber communication system, which forms one environment where the completed optoelectronic device may be used.
Figure 9:
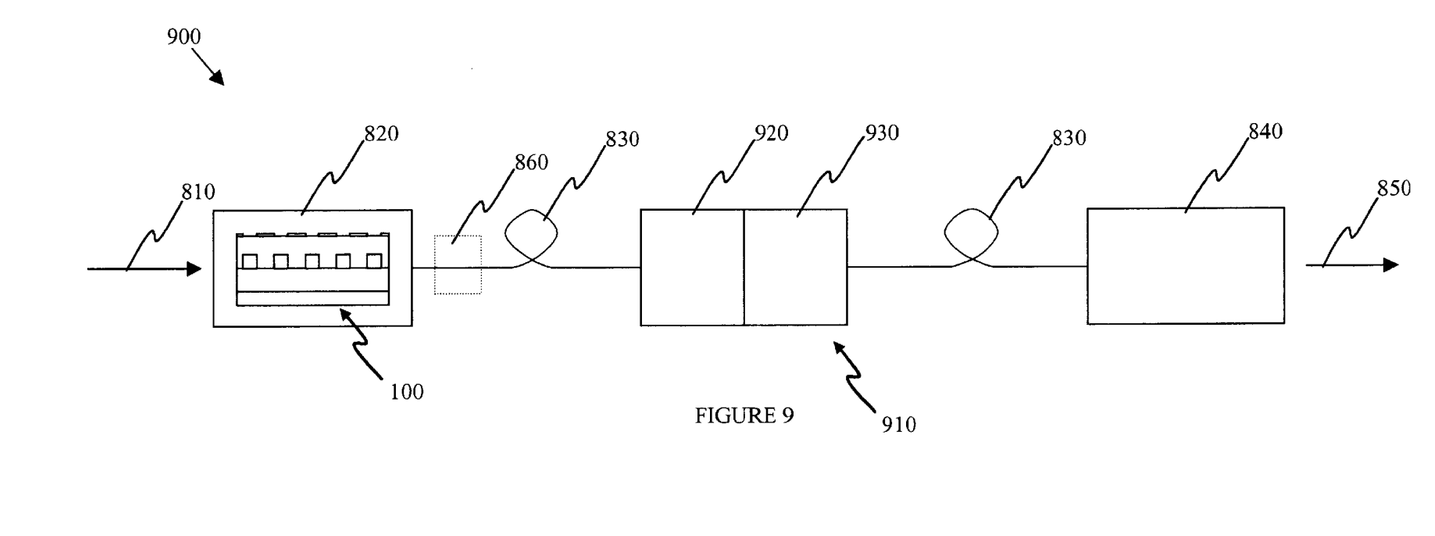
FIG. 9 illustrates an alternative embodiment optical fiber communication system, including a repeater.

Turning briefly to FIG. 8, illustrated is an optical fiber communication systems 800, which may form one environment where the completed optoelectronic device 100 may be included. The optical fiber communication system 800, in the illustrative embodiment, includes an initial signal 810 entering a receiver 820. The receiver 820, receives the initial signal 810, addresses the signal 810, and sends the resulting information across an optical fiber 830 to a transmitter 840. The transmitter 840 receives the information from the optical fiber 830, addresses the information, and sends an ultimate signal 850. As illustrated in FIG. 8, the completed optoelectronic device 100 may be included within the receiver 820. However, one having skill in the art understands that the completed optoelectronic device 100 may be included anywhere in the optical fiber communication system 800, including the transmitter 840. The optical fiber communication system 800 is not limited to the devices previously mentioned. For example, the optical fiber communication system 800 may include a source 860, such as a laser or a diode, or many other similar devices. Turning briefly to FIG. 9, illustrated is an alternative optical fiber communication system 900 in which the optoelectronic device 100 may be employed. In the illustrated embodiment, the optical fiber communication system 900 has a repeater 910 that includes a second receiver 920 and a second transmitter 930 located between the receiver 820 and the transmitter 840.

Although the present invention has been described in detail, those skilled in the art should understand that they can make various changes, substitutions and alterations herein without departing from the spirit and scope of the invention in its broadest form.

What is claimed is:

1. An optoelectronic device, comprising:
   a phosphorous doped silica optical core feature located over a silicon substrate;
   a boron phosphorous doped tetraethylorthosilicate (TEOS) outer cladding layer located over the optical core feature;
   an undoped silica inner cladding layer located between the silicon substrate and the optical core feature; and
   a direct patch mask formed on the outer cladding layer.

2. The optoelectronic device as recited in claim 1 wherein the direct patch mask comprises an essentially opaque material.

3. The optoelectronic device as recited in claim 2 wherein the opaque material is a metal.

4. The optoelectronic device as recited in claim 3 wherein the metal is selected from the group consisting of molybdenum, tantalum, tungsten, chrome, gold and titanium.

5. The optoelectronic device as recited in claim 1 wherein the direct patch mask has a thickness ranging from about 10 nm to about 500 nm.

6. The optoelectronic device as recited in claim 5 wherein the direct patch mask has a thickness ranging from about 50 nm to about 200 nm.

7. The optoelectronic device as recited in claim 1 further including multiple optical core features.

8. The optoelectronic device as recited in claim 7 wherein the direct patch mask has openings located therein and over the optical core features.

9. The optoelectronic device as recited in claim 1 wherein the inner cladding layer has a thickness of up to about 35000 nm, the optical core feature has a thickness ranging from about 1000 nm to about 10000 nm and the outer cladding layer has a thickness ranging from about 5000 nm to about 25000 nm.

10. The optoelectronic device as recited in claim 9 wherein the optical core feature has a thickness of about 6800 nm.

11. An optical fiber communications system, comprising:
    an optical fiber;

a transmitter and a receiver connected by the optical fiber; and an optoelectronic device including:
- a phosphorous doped silica optical core feature located over a silicon substrate;
- a boron phosphorous doped tetraethylorthosilicate (TEOS) outer cladding layer located over the optical core feature;
- an undoped silica inner cladding layer located between the silicon substrate and the optical core feature; and
- a direct patch mask formed on the outer cladding layer.

12. The optical fiber communication system as recited in claim 11 wherein the direct patch mask comprises an opaque material.

13. The optical fiber communication system as recited in claim 12 wherein the opaque material is a metal.

14. The optical fiber communication system as recited in claim 13 wherein the metal is selected from the group consisting of molybdenum, tantalum, tungsten, chrome, gold and titanium.

15. The optical fiber communication system as recited in claim 11 wherein the direct patch mask has a thickness ranging from about 10 nm to about 500 nm.

16. The optical fiber communication system as recited in claim 15 wherein the direct patch mask has a thickness ranging from about 50 nm to about 200 nm.

17. The optical fiber communication system as recited in claim 11 further including multiple optical core features.

18. The optical fiber communication system as recited in claim 17 wherein the direct patch mask has openings located therein and over the optical core features.

19. The optical fiber communication system recited in claim 11 wherein the transmitter includes the optoelectronic device.

20. The optical fiber communication system recited in claim 11 wherein the receiver includes the optoelectronic device.

21. The optical fiber communication system as recited in claim 11 further including a source.

22. The optical fiber communication system as recited in claim 21 wherein the source is a laser or a diode.

23. The optical fiber communication system recited in claim 11 further including a repeater.

* * * * *